Nov. 8, 1966 A. MARTIN 3,284,112
ROTATABLE FLANGE ADJUSTABLE PIPE COUPLING
Filed Dec. 11, 1963

INVENTOR.
ALAN MARTIN
BY
*Abraham A. Saffitz*
ATTORNEY

United States Patent Office 3,284,112
Patented Nov. 8, 1966

3,284,112
ROTATABLE FLANGE ADJUSTABLE
PIPE COUPLING
Alan Martin, Nutley, N.J., assignor to Horace T. Potts Company, Philadelphia, Pa., a corporation of Pennsylvania
Filed Dec. 11, 1963, Ser. No. 329,815
2 Claims. (Cl. 285—328)

The present invention relates in general to pipe couplings of the bolted flange type and to bolted flange-type pipe couplings used in corrosive fluid applications in particular.

Corrosion especially is a problem at pipe coupling locations due to the occurrences of slow leakage in these areas and the prolonged retention of the liquids within the parts of the coupling assembly. In an effort to overcome this problem proposals have been made heretofore to use corrosion resistant materials, such as stainless steel, in couplings.

Welding often has been used as the fabrication method in the past, but when using stainless steel, problems may later arise since the heat of welding is injurious to the corrosion resistance of the stainless steel. In addition, welding of coupling components results in a permanent connection so that diassembly of the welded components is not possible except by destroying the weldment and in so doing possibly destroying the components themselves.

Threading also has been used, but threading may be undesirable since it results in reduction of the effective wall thickness of the pipe and thus reduces the strength capabilities of the coupling. In addition, the ratio of cost to effective wall thickness would be much higher for a heavy wall threaded pipe coupling than for a thin walled pipe coupling joined by the method of the present invention.

The inventor is also aware of couplings incorporating wedge-type elements of ductile or plastic material which are permanently deformed during assembly of the coupling components. However, due to the fact that these elements are permanently deformed, they are not reusable if it is desired to disassemble a particular coupling and assemble another using the same components.

A coupling of the general type of the present invention is disclosed in O. Jahnke, Patent No. 1,004,270, issued September 26, 1911, for Flange Joint and in J. Mercier, Patent No. 2,480,496, issued August 30, 1949, entitled Tube Coupling. Reference is made to these patents for an understanding of the background in the general area of the present invention and for a fuller understanding of the basic principles and objects of the present invention.

The coupling of the present invention is of the bolted flange type and generally comprises a pair of identical coupling units, each of which consists of an insert and a flange having a tapered interface. The coupling is readily assembled using conventional expansion techniques and thereafter merely by tightening the coupling bolts. Due to the tapered interface, the flanges are accurately aligned upon the inserts during assembly and may be readily removed therefrom. Reuse of the coupling components is possible due to the fact that none of the coupling components are permanently deformed. The coupling furthermore possesses excellent sealing and strength capabilities and is additionally relatively inexpensive to manufacture and adjustable for use with thin wall-type piping since the pipes do not have to be threaded. The tapered insert to flange interface furthermore provides an excellent joint for high temperature applications with little or no adverse effects being imposed upon the joint connection due to expansion and contracting forces.

It is therefore a primary object of the present invention to provide a bolted flange-type coupling which is formed by conventional expansion techniques in conjunction with merely tightening the coupling bolts.

It is another primary object to provide a coupling of the bolted flange type, wherein proper alignment of the flanges may be readily accomplished prior to and during the assembling and securing operation.

It is another object to establish effective sealing at the interfaces between the coupling units and the pipe sections merely by tightening the coupling bolts.

It is a further object to provide a coupling, wherein there is no permanent deformation of the coupling elements nor permanent bonding involved so as to permit reuse of the coupling components.

It is another object to provide a bolted flange-type coupling which is readily disassembled.

It is a further object to eliminate the need for threads or weldments and the attendant costs and liabilities associated therewith.

The foregoing and numerous other objects and advantages will be more apparent from the following detailed description when considered in connection with the accompanying drawings, wherein.

Figure 1:
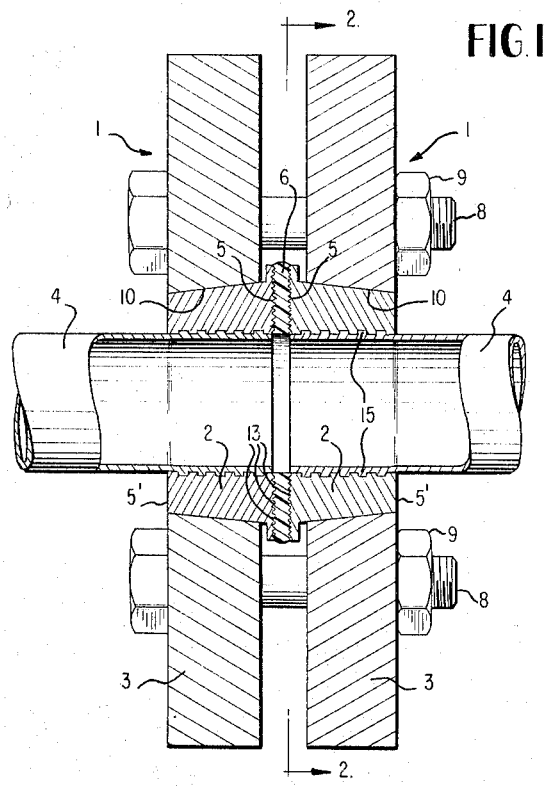
FIG. 1 shows a longitudinal section view of the pipe coupling of this invention.
Figure 2:
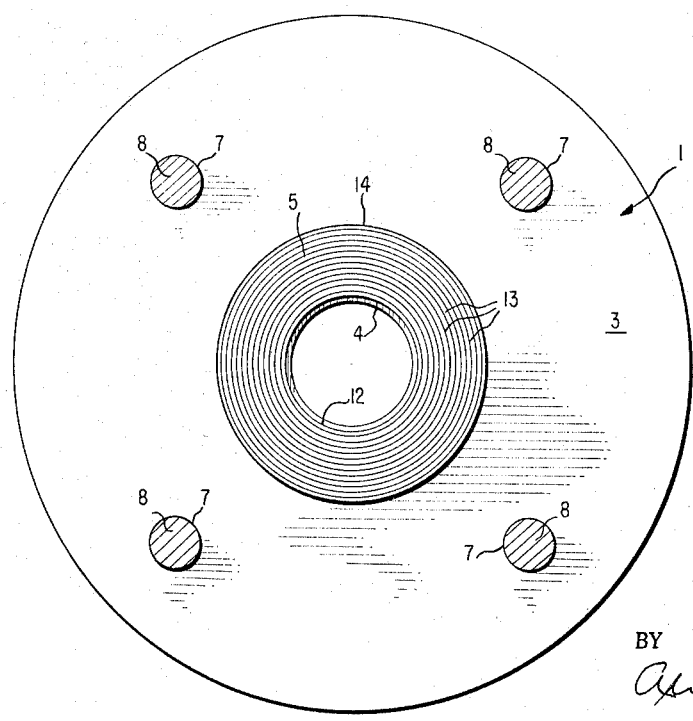
FIG. 2 is a sectional view taken along line 2—2 of FIG. 1.

Referring to the drawings, and particularly to FIG. 1, the improved pipe coupling of the present invention comprises a pair of identical coupling units, each being generally indicated by the numeral 1. Each unit comprises an insert element 2 and a flange element 3, with each insert element 2 being disposed upon the end portion of respective pipe sections 4 to be joined in axial alignment. The pipe material will generally consist of stainless steel for example, or other high strength corrosion resistant material such as titanium, tantalum, Rene 41, or nickel. Between the inner ends 5 of inserts 2 is provided a gasket 6. Concentric ring formations 13, as seen best in FIG. 2, are provided on the inner faces of inserts 2 to engage the opposite flat surfaces of gasket 6 and improve the sealing in this area. Bolt holes 7, as also seen in FIG. 2, are provided in flanges 3 to receive bolts 8 to which are applied nuts 9 during assembly of the complete coupling.

Figure 3:
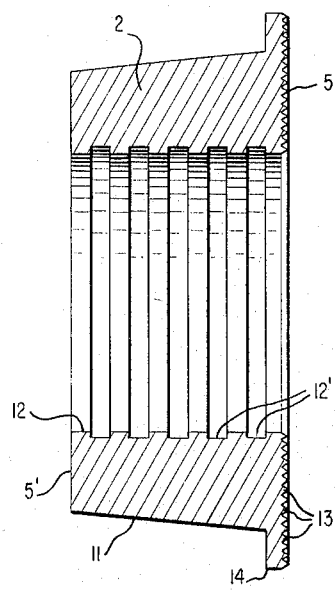
FIG. 3 is an isolated longitudinal sectional view of the insert 2 seen in FIG. 1.

As seen in FIG. 3, each of the insert elements used in the present invention comprises an annular ring-like element having a uniform inner bore 12 including ridge-like undercut groove sections generally indicated by 12'. The radial outer surface 11 of the insert element 2, however, is not uniform in diameter, but tapers gradually from the outer end 5' of the insert 2 towards the inner end 5. This taper is obtained by forming the insert 2 with a constantly increasing radial wall thickness from the outer end 5' and towards the inner end 5 thereof, while the bore 12 remains constant. At the inner end portion of the insert 2, a radially extending shoulder 14 is provided which extends radially beyond the maximum diameter of the outer surface 11 of the insert, and as seen in FIG. 3, at its inner end comprises a continuation of the surface 13 of the insert. The essential purpose of the shoulder 14 is to prevent the insert 2 from being pulled through the bores 10 or, conversely, the flanges 3 from being tightened to such an extent that they are pulled over the inner ends of the inserts.

As seen in FIG. 1, each of the flange elements 3 includes a tapered bore 10 which corresponds in configuration to the tapered outer surface 11 of each insert element 2. That is, the diameter of bore 10 increases constantly as the inner face of each flange 3 is approached.

It is contemplated to form the inserts 2 of stainless steel or other high strength, corrosion resistant material generally similar or the same as the pipe material; to form the flanges from a less costly material than the inserts, such as ductile iron, forged steel, cast iron, or carbon steel. The gasket 6 may be formed of "Teflon" or neoprene.

While the taper of the outer surface 11 of inserts 2 have been shown exaggerated in the drawings for clarity, it is to be understood that the actual degree of taper that is best for each coupling application may vary, depending upon choice of materials, diameter of pipe joint, axial tensile loads, etc. However, tests conducted indicated that the range of from 1 to 5 degrees of taper between the maximum and minimum outer diameter (O.D.) of the insert element is optimum and in certain instances critical when the insert material is stainless steel and the flange is either ductile iron or forged steel, and when the pipe size is between ½ inch I.P.S. (.840 in. O.D.) and 6 inch I.P.S. (6.625 in. O.D.).

To assemble and fixedly secure the coupling, it is placed over the pipe sections in a manner such that the maximum diameter of tapered bores 10 of the flanges 3 are disposed inwardly towards the pipe ends. The coupling is then moved inwardly along the pipe sections a sufficient distance to permit the positioning of the inserts upon the pipe sections adjacent the ends thereof, as shown in FIG. 1. Preferably, the dimensions are such that there is a slip fit between the inserts 2 and the pipe sections 4. Once in position, conventional expansion techniques are used to secure the inserts upon the pipe sections. By this method, an expansion tool is inserted through the pipe ends and suitably manipulated so as to force the pipe walls against the inserts. Sufficient forces are generated so that the outer surfaces of the pipes are plastically and permanently deformed into the grooves 12' of the inserts, as noted by numeral 15 in FIG. 1. The interlocking of the projections 15 within the grooves 12' are substantially the sole means by which the inserts are secured upon the pipes in an axial sense.

After the expansion phase, the pipes are brought into generally abutting relationship and the flanges are rotated, if necessary, to align the bolt holes of the mating couplings. To rotate the flange elements on the inserts, it is only necessary to strike the flange 3 with a sharp blow to disengage it from the insert 2. All that is then necessary is to insert a gasket 6 between the opposite inner faces of the inserts 2 and then insert the bolts 8 through the bolt holes 7 in the flanges 3 and to tighten the nuts 8 upon the bolts to complete the coupling. As seen in FIG. 1, when the bolts are finally tightened, a small space 16 is left between the inner face of each flange 3 and the adjacent outer radial surface of each shoulder 14 of the inserts 2. This space will usually be in the order of one millimeter or less and is shown exaggerated in the drawings for clarity. This space 16 permits necessary room for expansion and contraction of the pipe joint assembly without the creation of undue stresses at any one area of the joint assembly.

The resulting coupling is highly resistant to leakage at the interfaces between the inserts and pipe sections due mainly to the multiple barrier effect in these areas resulting from the expansion of the pipe surfaces into the grooves. The same general effect is present at the insert-gasket interfaces due to the V-shaped grooves 13.

The tapered inserts facilitate accurate alignment of the flanges upon the inserts. In addition, the tapered interfaces provide a non-permanent interconnection permitting easy removal of the flanges from the inserts. In addition, the use of a properly designed insert element, that is, one having the optimum degree of taper at its peripheral surface, prevents serious locking or binding of the flange on the insert during assembly, thereby permitting easier alignment of the coupling components and the bolt holes.

Furthermore, due to the tapered interfaces between the inserts and the flanges, the relative dimensions of the flanges and inserts are not especially critical. Slight differences in the outer dimensions of the inserts and the dimensions of the tapered bores result in merely a different axial positioning of the flanges upon the inserts, which is not critical in securing a strong, leak-proof coupling. In addition, when the coupling is subjected generally to tensile-type loading, a wedging interaction results between the inserts and flanges so as to effectively resist the tendency of the flanges to separate from the inserts.

In tightening the bolts the inserts tend to be compressed radially inwardly uniformly a slight amount due to the circumferential wedging interaction between the bores 4 of the flanges and the tapered outer surfaces of the inserts. Thus, the radial pressure at the interfaces between the inserts and pipes increases so as to improve the sealing capabilities in these locations. Additionally, depending upon the design parameters and the particular materials employed, the flanges may tend to bend inwardly or "bell mouth" upon tightening of the bolts. This results in increased radial and circumferential pressure between the pipes and inserts so that the sealing capabilities in these areas are further enhanced.

The shoulders 14 on the inserts act as abutments for the flanges and prevent the flanges from being driven too far onto the inserts, both while tightening the bolts and also while under tensile-type loading tending to separate the inserts from the flanges.

Dissassembly of the coupling is effected by removing the flange nuts 9 and striking the flange or insert elements with a hammer blow. The radial forces existing at the flange bore and insert interface cause the flanges to literally spring outwardly off from the inserts. The insert may be removed from the pipe end by cutting off the expanded pipe end section and removing the cut-off pipe section from the inside bore of the insert. While this will destroy the pipe end, it is to be noted that both flange and insert are readily reusable.

Having fully described the invention, it is to be understand that the inventor does not wish to be limited to the details herein set forth, but instead the invention is of the full scope of the appended claims.

I claim:

1. A flange-type coupling for joining a pair of aligned unthreaded pipe ends comprising: a pair of identical annular insert elements for opposing alignment with each other, one of which is inserted by a slide fit over each pipe end, each insert element having its axially extending outer surface formed as a truncated cone with the outer conical taper thereof increasing toward the rear end which lies adjacent the outer edge of each pipe end, the slope of said tapered outer surface of each of said insert elements being from 1 to 5 degrees; annular gasket seal means disposed between the opposing surfaces of said insert elements; a pair of identical annular flange ring members each of which is tapered at its inner bore to fit over a corresponding one of said insert elements; a plurality of flange bolts to draw said insert elements and seal means together in a unitary joint in assembled paired relationship; each of said insert elements having spaced concentrically disposed grooves and lands on the inner bore, said grooves and lands being equally spaced and extending from one axial end of said inner bore to the other and forming right angle serrations, the unthreaded pipe end being inserted therein flush with the axially forward end faces of said inserts and being radially outwardly pressed into said grooves and retained therein by said lands; each of said annular flange members having the maximum diameter of its inner walls less than the maximum outer diameter of said inserts, thereby frictionally locking the inserts in said inner walls; the external face of each of said inserts being provided with a plurality of concentric grooves for grasping the gasket seal means and for preventing leakage of fluid across said gasket seal means; and said inserts being further provided at their axially forward ends with a radially outwardly extending shoulder for preventing the insert from being pulled in an outward direction past said shoulder through said flange bores, the axially forward end face of said shoulder being in the same plane as the axially forward end face of said insert and normal to the axis of said insert, said grooves forming a saw tooth surface extending from the radially outer portion of said flanges to the wall of the bore in said inserts.

2. The pipe coupling as recited in claim 1, wherein the inserts are made of a corrosion resistant resilient material.

References Cited by the Examiner

UNITED STATES PATENTS

| | | | |
|---|---|---|---|
| 1,887,877 | 11/1932 | Shaffer | 285—368 X |
| 1,906,826 | 5/1933 | Smith | 285—368 X |
| 2,429,076 | 10/1947 | Sery | 285—382.4 |
| 3,149,860 | 9/1964 | Hallesy | 285—417 X |

FOREIGN PATENTS

| | | |
|---|---|---|
| 451,486 | 2/1913 | France. |
| 750,770 | 6/1933 | France. |
| 1,175,126 | 3/1959 | France. |
| 8,180 | 1906 | Great Britain. |

CARL W. TOMLIN, *Primary Examiner.*